March 13, 1956  R. G. TOWLE ET AL  2,738,033
VALVE OPERATING MECHANISM
Filed Aug. 14, 1953  2 Sheets-Sheet 1
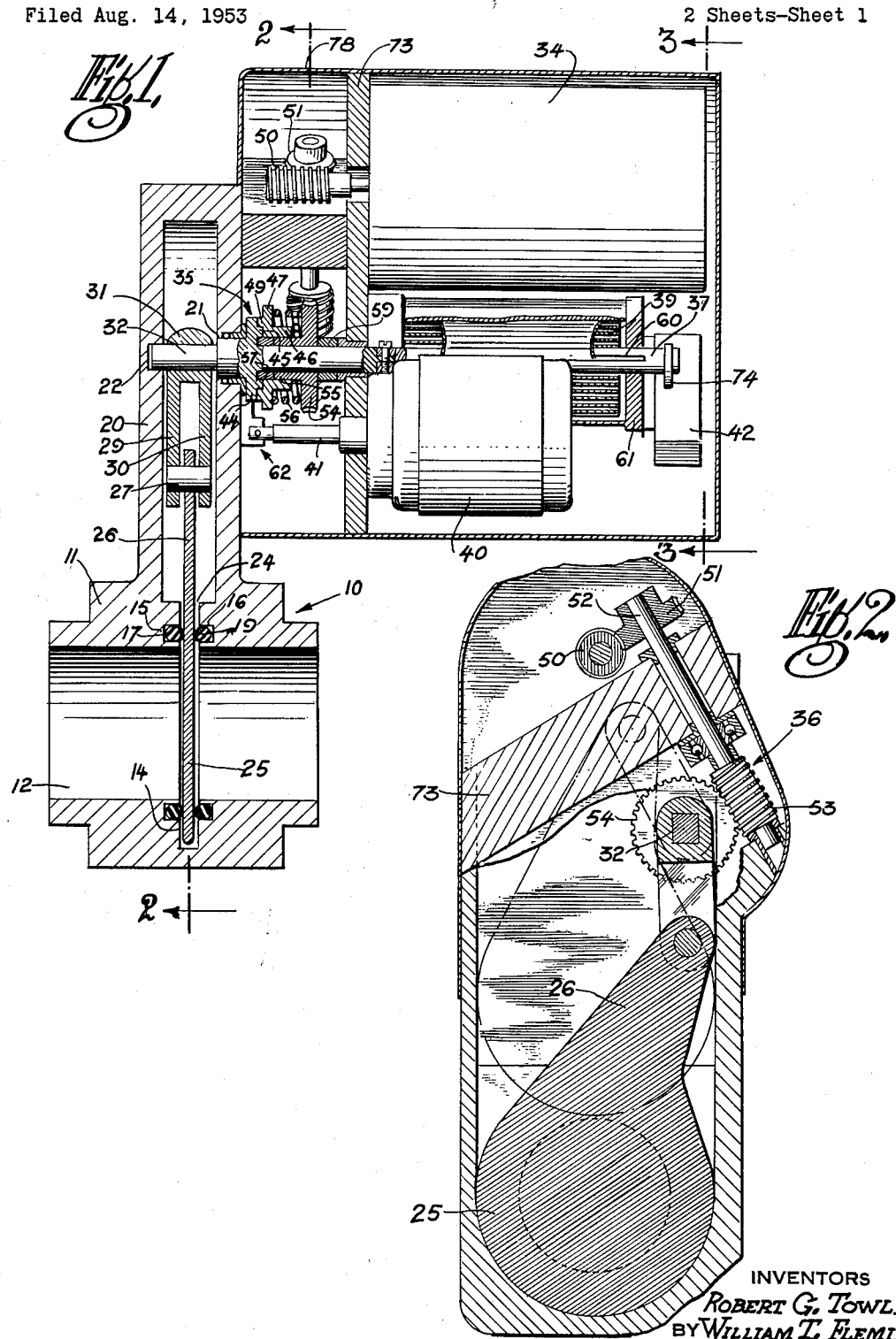
INVENTORS
ROBERT G. TOWLE
BY WILLIAM T. FLEMING
Ernest A. Joerien
ATTORNEY March 13, 1956  R. G. TOWLE ET AL  2,738,033
VALVE OPERATING MECHANISM
Filed Aug. 14, 1953  2 Sheets-Sheet 2
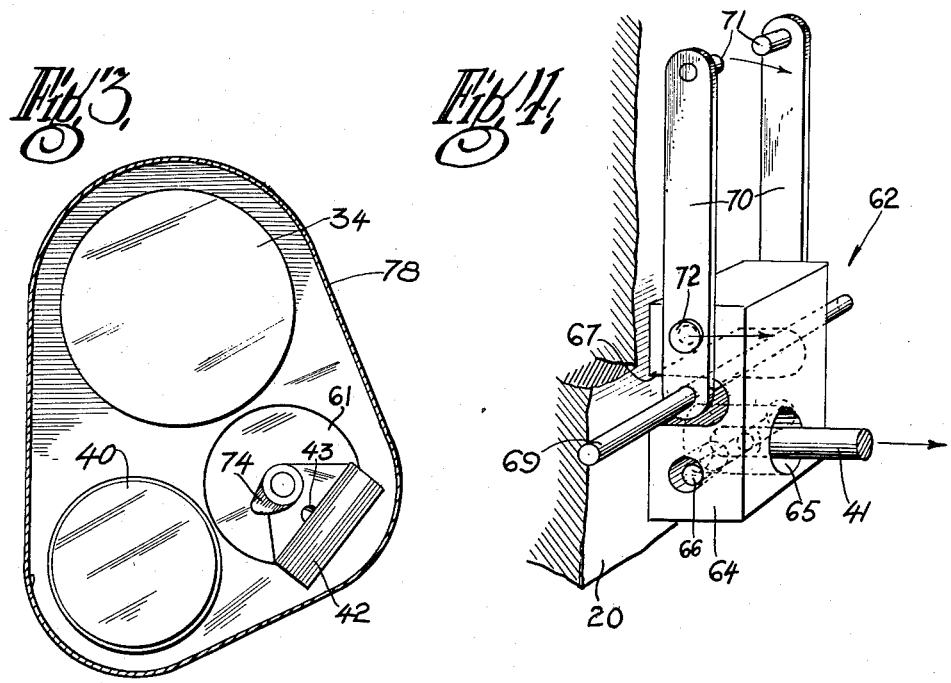
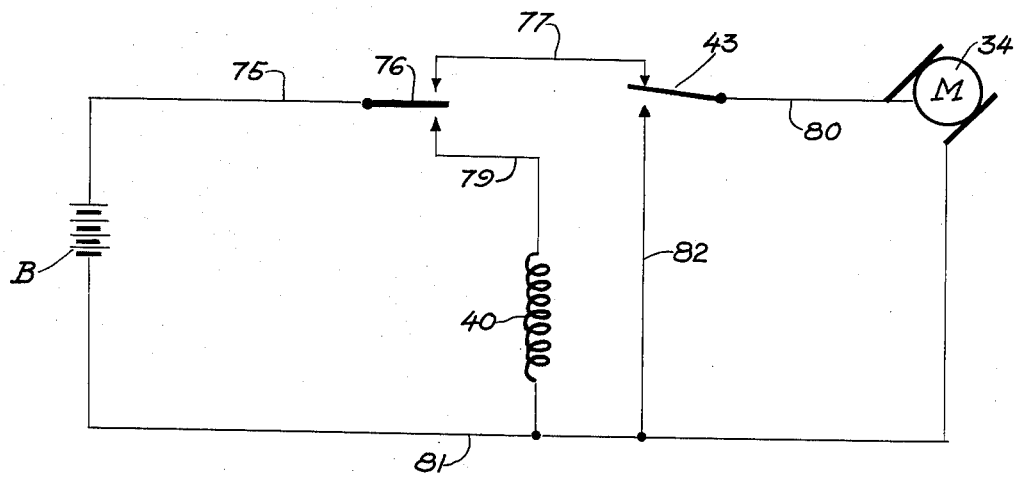
INVENTORS
ROBERT G. TOWLE
BY WILLIAM T. FLEMING
Ernest A. Joenen
ATTORNEY United States Patent Office 2,738,033
Patented Mar. 13, 1956

2,738,033
VALVE OPERATING MECHANISM

Robert G. Towle, New City, N. Y., and William T. Fleming, West Orange, N. J., assignors to Specialties Development Corporation, Belleville, N. J., a corporation of New Jersey Application August 14, 1953, Serial No. 374,177

1 Claim. (Cl. 185—40)

This invention relates to valves and valve operating mechanisms and, more particularly, to improvements in electrically operated valves and the mechanism for operating such valves.

In aircraft and marine fuel and lubricating systems, it has frequently been found desirable to place valves in the fuel and oil lines as near to the tanks as possible so that in the event of an emergency, such as an opening in the lines, the valves could be closed to minimize the loss of fuel or oil, and to prevent it from spilling on hot surfaces and igniting. Since rapid access to such tanks, and the valves associated therewith, is often impossible, because of the location thereof, particularly when the vehicle is in transit, it has heretofore been proposed to use electrically operated valves wherein a valve member is seated and unseated by the operation of an electric motor, controlled from a remote location. Such valves are relatively slow operating and are not satisfactory in applications requiring quick opening or quick closing valves, for example, in case of a collision or other emergency.

Accordingly, an object of the present invention is to provide an electrically operated valve which overcomes the foregoing disadvantages.

Another object is to provide such a valve which is extremely quick closing.

Another object is to provide such a valve which remains in its opened or closed position without continuous energization of the actuating means, whereby its position will not change in the event of a power failure.

Another object is to provide such a valve which requires only a small amount of power for its actuation, and which requires no power to maintain it in both its opened and closed positions.

Another object is to provide such a valve which is simple, compact and rugged in construction, economical to manufacture and reliable in its operation.

A further object is to provide valve operating mechanism for use in connection with such a valve whereby the foregoing objects may be accomplished.

Other and further objects of the invention will be obvious upon an understanding of the illustrative embodiment about to be described, or will be indicated in the appended claim, and various advantages not referred to herein will occur to one skilled in the art upon employment of the invention in practice.

In accordance with the invention, the foregoing objects may be accomplished by providing a valve comprising a body having a port provided with a seat, a valve member for the seat, a shaft connected to the valve member for operating the same to open and close the port, spring means connected to the shaft for rotating the same in one direction, means including a motor and a clutch operatively connected to the shaft for rotating the same in the opposite direction to load the spring means and means for rendering the clutch ineffective to render the spring means effective.

More specifically, the means including a motor and a clutch operatively connected to the shaft for rotating the same, may include a second shaft in driven connection with the motor and in driving connection with the clutch for rotating the first mentioned shaft against the action of the spring means to open the valve and load the spring when the clutch is engaged.

A preferred embodiment of the invention has been chosen for purposes of illustration and description, and is shown in the accompanying drawings, forming a part of the specification, wherein:

Fig. 1 is a longitudinal sectional view of a valve and its operating mechanism in accordance with the present invention.

Fig. 2 is a stepped sectional view taken along line 2—2 on Fig. 1.

Fig. 3 is a sectional view taken along line 3—3 on Fig. 1.

Fig. 4 is an enlarged perspective view of the clutch operating linkage.

Fig. 5 is a diagrammatic view of a circuit in which the valve is connected.

Referring to the drawings, and more particularly to Figs. 1 to 3 thereof, there is shown a valve 10 comprising a valve body 11 formed with a bore 12 and an annular groove 14 forming a seat. The side walls of the groove 14 are provided with oppositely disposed annular grooves 15 and 16 in which are mounted O-rings 17 and 19, respectively. The valve body has an upstanding housing portion 20 formed with an aperture 21 in one sidewall, and a bore 22 in the other sidewall opposite the aperture for the purpose to be described hereinafter. The upper segment of the seat 14 is provided with a slot 24 which communicates with the interior of the housing portion 20.

The flow of fluid medium through the bore 12 is controlled by a gate-type valve member 25 for the seat 14. As shown in Figs. 1 and 2, the valve member is a generally circular disc formed with an upwardly extending projection 26, the upper end of which is pivotally connected by a pin 27 to the legs 29 and 30 of a bifurcated link 31. The other end of this link is connected to a shaft 32 which extends through the aperture 21 in the housing portion 20 and is journalled at one end in the bore 22. The shaft 32 is in driven connection with an electric motor 34, for rotation thereby, through a clutch 35 and a gear train 36, to be discussed more fully hereinafter.

The end of the shaft 32, opposite its journalled end, is coupled to a second shaft 37 which is connected to a spiral torsion spring 39 for rotation in a direction opposite to the direction of rotation imparted by the motor 34, when the clutch 35 is disengaged. A solenoid 40, having an armature provided with a shaft 41 arranged for rendering the clutch ineffective and the spring 39 effective, is connected in a circuit for remote control of the valve operating mechanism, and a micro switch 42 is provided, as will be described hereinafter, to de-energize the motor after a predetermined period.

The clutch 35 is of the dog type and comprises a disc 44 integral with the shaft 32 and a sleeve 46 having an annular flange 47 facing the disc 44. The disc 44 and the flange 47 are each formed with a plurality of annularly spaced dogs or projections 45 and 49, respectively, which are adapted to intermesh when the flange 47 is moved adjacent the disc 44.

The gear train 36 consists of a worm gear 50 mounted on the shaft of the motor 34, a worm wheel 51 mounted on a shaft 52 and in driven engagement with the worm gear 50, a worm gear 53 mounted at the other end of the shaft 52 for rotation therewith, and a worm wheel 54 in engagement with the worm gear 53.

As shown in Fig. 1, the worm wheel 54 is formed with a sleeve portion 55 and, together with this sleeve portion, surrounds the shaft 32. The exterior surface of the sleeve portion 55 is hexagonal in cross-section and serves as a mount for the sleeve 46, the interior surface of which is also hexagonal in cross-section for engagement therewith, whereby the sleeve 46 and the flange 47 may slide longitudinally with respect to the worm wheel 54, but are connected thereto for rotation therewith when the motor 34 is energized. A helical spring 56 surrounds the sleeve 46, and, bearing against the worm wheel 54, normally urges the flange 47 in a direction towards the disc 44 to cause the dogs 45 and 49 to intermesh to render the clutch 35 effective.

A pair of collars or spacers 57 and 59 surround the shaft 32 and abut the sleeve portion 55 and the worm wheel 54, respectively, to prevent the worm wheel from sliding longitudinally on the shaft 32 to disengage the worm gear 53.

The worm gears and worm wheels in the gear train 36 are selected so that they are self-locking, wherefore when the motor 34 is de-energized the spring 39 cannot cause the shaft 32 to rotate to close the valve so long as the clutch 35 is engaged.

The shaft 37, in effect, is an extension of the shaft 32 and is formed with a diametrical longitudinally extending slot 60. The internal end of the spiral spring 39 passes through the slot 60 and is crimped, or otherwise suitably secured to the shaft 32, and the external end of the spring is retained stationary, for example, by being suitably secured to a housing 61 for the spring. In mounting the spring 39 in the housing 61, it is preferred that the spring be placed under an initial tension so that when the gate 25 is seated, it is retained in such position by a positive force until opened by the motor 34.

The solenoid 40 is mounted adjacent the spring 39 so that its shaft 41 extends towards the housing 20 and is parallel to the longitudinal axis of the shaft 32. A suitable linkage 62, represented schematically in Fig. 1, for convenience, connects the extremity of the shaft 41 and the flange 47, whereby movement of the shaft 41 in a direction towards the solenoid 40, upon energization thereof, serves to render the clutch 35 ineffective.

As shown in Fig. 4, the linkage 62 includes an elongate block 64 formed with a bore 65 adjacent one end thereof to receive the end of the shaft 41 which is pivotally connected to the block by a pin 66 journalled at each end in the block and passing through the bore 65 and the shaft 41. The block 64 is further formed with an inverted, U-shaped groove 67 which permits the block to fit over a stationary pin 69. A pair of similar arms 70 are pivotally mounted at one end on the pin 69, and extend adjacent the sides of the block to a point beyond the end thereof where each arm is formed with an inwardly facing projection 71, for a purpose to be described hereinafter. A pin 72 is journalled at its ends in the arms 70 and extends through the block 64 adjacent the end thereof opposite the end in which the bore 65 is formed. When the solenoid is de-energized, the base of the block 64 abuts the housing 20.

The micro switch 42, for limiting the rotation of the motor 34, is mounted on the spring housing 61 adjacent the end of the shaft 37, which extends beyond the housing. The switch is normally closed and has a contact arm 43 disposed for actuation to open the switch by a cam 74 formed on the shaft 37.

A bracket 73 is secured to the housing 20 to serve as a mounting for the motor 34, the shaft 32 and the solenoid 40, and, if desired, a cap member 78 may be mounted on the valve body to cover and protect the operating mechanism.

As shown in Fig. 5, the elements for controlling the operation of the valve are in their respective positions when the valve is closed. The circuit may consist of a battery B, the conductor 75, a manually operable single-pole, double-throw switch 76, conductors 77 and 79, the contact arm 43 of the micro switch 42, conductor 80, motor 34, conductors 81 and 82 and solenoid 40. When the switch 76 contacts the conductor 77, a circuit is completed from the battery to the motor 34 through the conductor 75, the switch 76, the conductor 77, the contact arm 43, the conductor 80 and the return conductor 81. Operation of the motor causes rotation of the shaft 37, as will be described, until the cam 74 causes the contact arm 43 to break contact with the conductor 77 and make contact with the conductor 82 thereby short circuiting the field of the motor and creating a braking effect thereon. When the switch 76 contacts the conductor 79, the battery will supply current to the solenoid 40 through the conductor 75, the switch 76, and the conductor 79, completing the circuit through the conductor 81. Actuation of the solenoid 40 causes the shaft 37 to rotate in a direction opposite to that effected by actuation of the motor 34, as will be described, wherefore the cam 74 permits the contact arm 43 of the micro switch 42 to return to its normal position as shown in Fig. 5.

In operation, to open the valve, the switch 76 is urged to make contact with the conductor 77 whereupon the motor 34 is energized as described heretofore. Rotation of the motor is transmitted through the gear train 36 to effect rotation of the worm wheel 54, the sleeve 46 and the flange 47. The dogs 49, intermeshed with the dogs 45 of the disc 44, under the influence of the spring 56, cause the disc and the shaft 32 to rotate in a clockwise direction, as viewed in Fig. 2, wherefore the link 31 rotates with the shaft to lift the gate 25 to the position shown in dotted lines in Fig. 2. Simultaneously, the rotation of the shaft 32 effects rotation of the shaft 37 to load the spring 39. When the gate reaches the position shown in dotted lines, the cam 74 operates the switch 42 to stop the supply of power to the motor and to short circuit the field of the motor to quickly stop rotation thereof, as was described heretofore.

To close the valve, the switch 76 is operated to make contact with the conductor 79 to energize the solenoid 40, as described heretofore, to move the shaft 41, and the end of the block 64, to which it is connected, towards the solenoid. Such movement of the block 64 causes the arms 70 to pivot on the pin 69, whereupon the projections 71 engage the flange 47 and urge the sleeve 46 to slide on the sleeve portion 55 towards the worm wheel 54 until the dogs 49 disengage the dogs 45. The shaft 32, coupled to the shaft 37, is then free to rotate, under the influence of the torsion spring 39, in a counterclockwise direction, as viewed in Fig. 2, to seat the gate 25. As the shafts 32 and 37 rotate to close the valve, the cam 74 urges the contact arm of the switch 42 into contact with the conductor 77, wherefore the valve, and its operating mechanism, has completed a cycle of operation and is now ready to be opened again by urging the switch 76 into contact with the conductor 77.

From the foregoing description, it will be seen that the present invention provides a simple, reliable, compact valve of the character indicated herein which is extremely quick closing, and which is fail-safe in that it requires no power to maintain it in either the opened or the closed position, so that in the event of a power failure, the valve will not change its position. The time required for the gate to close has been measured at .016 second from the initial impulse to the solenoid. The actual travel time of the gate in closing is only about .007 second. It will also be seen that the valve of the present invention requires only a small amount of power for its actuation, particularly for its closing operation since the solenoid need only be energized momentarily to effect operation thereof. It will also be seen that the valve operating mechanism may be rearranged to provide a quick opening valve in which the motor performs the closing operation and the torsion spring effects quick opening. The apparatus has great utility in a wide variety of applications of great importance in the marine, aircraft and industrial fields.

As various changes may be made in the form, construction and arrangement of the parts herein, without departing from the spirit and scope of the invention and without sacrificing any of its advantages, it is to be understood that all matter herein is to be interpreted as illustrative and not in any limiting sense.

We claim:

Mechanism for operating a valve comprising a unidirectional motor having a shaft; a worm gear on said shaft; a second shaft having a worm wheel at one end thereof in driven engagement with said worm gear and having a second worm gear at the other end thereof; a valve operating shaft parallel to said motor shaft having a second worm wheel at one end provided with a sleeve mounted thereon for rotation therewith and in driven engagement with said second worm gear whereby said motor is adapted to effect rotation of said valve operating shaft in one direction, the exterior surface of said sleeve being polygonal in contour; an annular flange formed with a sleeve portion slideably mounted on said sleeve surface for rotation therewith and having a plurality of circumferentially spaced projections thereon; an annular disc integral with said valve operating shaft having a plurality of circumferentially spaced projections thereon adapted to intermesh with said projections on said flange; a helical spring disposed between said flange and said second worm wheel and surrounding said sleeve and said sleeve portion and being adapted to urge said projections into intermeshing relation; a spiral torsion spring having one end secured to said valve operating shaft between the ends thereof for rotating the same in the direction opposite to that in which said motor effects rotation of said valve operating shaft; a normally deenergized solenoid having an armature shaft parallel to said valve operating shaft and provided with means at the free end thereof for engaging said flange and sliding the same on said first mentioned sleeve in a direction towards said second worm wheel in opposition to said helical spring to disengage said projections upon energization of said solenoid to render said torsion spring effective; cam means mounted on said valve operating shaft at the other end thereof for rotation therewith; and switch means operable by said cam means to deenergize said motor upon rotation thereof a predetermined annular distance in a direction to wind said torsion spring.

References Cited in the file of this patent

UNITED STATES PATENTS

| | | |
|---|---|---|
| 2,118,944 | Purdy | May 21, 1938 |
| 2,490,044 | Garbarini | Dec. 6, 1949 |
| 2,496,187 | Whitted | Jan. 31, 1950 |